US012672650B2

(12) United States Patent
Kienle et al.

(10) Patent No.: US 12,672,650 B2
(45) Date of Patent: Jul. 7, 2026

(54) STORAGE STABLE GLUFOSINATE FORMULATION

(71) Applicant: BASF SE, Ludwigshafen (DE)

(72) Inventors: Marcel Patrik Kienle, Limburgerhof (DE); Wolfgang Meier, Limburgerhof (DE); Jochen Schreieck, Limburgerhof (DE); Steffen Kuhn, Limburgerhof (DE); Ingo Meiners, Limburgerhof (DE); Siyuan Tan, Research Triangle Park, NC (US); Cyrill Zagar, Research Triangle Park, NC (US)

(73) Assignee: BASF SE, Ludwigshafen (DE)

( * ) Notice: Subject to any disclaimer, the term of this patent is extended or adjusted under 35 U.S.C. 154(b) by 58 days.

(21) Appl. No.: 18/911,031

(22) Filed: Oct. 9, 2024

(65) Prior Publication Data

US 2025/0031691 A1 Jan. 30, 2025

Related U.S. Application Data

(63) Continuation of application No. PCT/EP2023/075658, filed on Sep. 18, 2023.

(30) Foreign Application Priority Data

Sep. 20, 2022 (EP) .................................... 22196470
Apr. 14, 2023 (EP) .................................... 23167992

(51) Int. Cl.
*A01N 25/02* (2006.01)
*A01G 7/00* (2006.01)
*A01N 57/20* (2006.01)
*A01P 13/02* (2006.01)

(52) U.S. Cl.
CPC ............... *A01N 25/02* (2013.01); *A01G 7/00* (2013.01); *A01N 57/20* (2013.01); *A01P 13/02* (2021.08)

(58) Field of Classification Search
CPC ......... A01N 25/02; A01N 57/20; A01P 13/02; A01G 7/00
See application file for complete search history.

(56) References Cited

U.S. PATENT DOCUMENTS

2005/0266999 A1 12/2005 Frisch et al.
2007/0184982 A1* 8/2007 Long ...................... A01N 25/22 504/201
2016/0338348 A1 11/2016 Rader et al.
2020/0385767 A1 12/2020 Green et al.
2021/0127681 A1 5/2021 Lorentz et al.
2022/0064680 A1* 3/2022 Green .................... A01N 25/30

FOREIGN PATENT DOCUMENTS

WO WO-2007092351 A2 8/2007
WO WO-2021097530 A1 * 5/2021 ............. A01N 25/02
WO WO-2021148302 A1 7/2021

OTHER PUBLICATIONS

European Patent Application No. 22196470.3, Extended European Search Report, dated Feb. 15, 2023.
International Application No. PCT/EP2023/075658, International Search Report, mailed Nov. 27, 2023.
Ruhland et al., A comparative investigation of the metabolism of the herbicide glufosinate in cell cultures of transgenic glufosinate-resistant and non-transgenic oilseed rape (*Brassica napus*) and corn (*Zea mays*) Environ. Biosafety Res., 1:29-37 (2002).
Safety Data Sheet, Forfeit(TM) 280 Herbicide, downloaded from the Internet at: <http://msdsdigital.com/system/files/mpB91002.pdf> (Jan. 2013).

* cited by examiner

*Primary Examiner* — Ali Soroush
*Assistant Examiner* — Andriae M Holt
(74) *Attorney, Agent, or Firm* — MARSHALL, GERSTEIN & BORUN LLP

(57) ABSTRACT

The present invention relates to a glufosinate-containing formulation having good cold stability, to the use of 1-methoxy-2-propanol to improve the cold stability of a formulation comprising glufosinate, and to a method for selectively controlling weeds in an area comprising applying an effective amount of the inventive formulation.

7 Claims, No Drawings

STORAGE STABLE GLUFOSINATE FORMULATION

This application is a continuation of International Application No. PCT/EP2023/075658, filed Sep. 18, 2023, which claims priority to European Patent Application Nos. 23167992.9 and 22196470.3 filed Apr. 14, 2023 and Sep. 20, 2022, respectively; the aforementioned applications are hereby incorporated herein in their entireties.

The present invention relates to a glufosinate-containing formulation having good cold stability, to the use of 1-methoxy-2-propanol to improve the cold stability of a formulation comprising glufosinate, and to a method for selectively controlling weeds in an area comprising applying an effective amount of the inventive formulation.

The herbicide glufosinate is a non-selective, foliarly-applied herbicide considered to be one of the safest herbicides from a toxicological or environmental standpoint. It is known that L-glufosinate (also known as phosphinothricin or (S)-2-amino-4-(hydroxy(methyl) phosphonoyl)butanoic acid) is more potent than D-glufosinate (Ruhland et al. (2002) Environ. Biosafety Res. 1-29-37).

Herbicides are needed all around the world. The herbicidal formulations may need to be stored under various conditions, such as in unheated warehouses. Thus, there is a need of herbicidal formulations that are stable at rather cold temperatures. In the case of glufosinate-containing formulations, there are already cold stable formulation available, which however provide reduced biological impact (e.g. WO 2007092351).

Therefore, herbicidal formulations having a sufficient cold stability comprising L-glufosinate are of particular interest.

Against this background, it was an object of the present invention to provide a glufosinate-containing formulation, in particular a L-glufosinate-containing formulation, having a sufficient cold stability. Further, it was an objective of the present invention to provide a glufosinate-containing formulation having a sufficient cold stability and sufficient biological impact.

It has surprisingly been found by the inventors of the present invention, that at least one of the above objectives can be achieved by the specific herbicidal formulation as claimed. It has in particular been found by the inventors of the present invention, that the specific glufosinate-containing formulation provides a sufficient cold stability.

The present invention relates to a formulation comprising 8.0 to 50.0 wt.-% of glufosinate or a salt thereof,
19.0 to 50.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water, each based on the total weight of the formulation.

In particular, the present invention relates to a formulation comprising 12.0 to 50.0 wt.-% of glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water, each based on the total weight of the formulation.

As used herein, the term "glufosinate" may refer to L-glufosinate, D-glufosinate or a mixture of L- and D-glufosinate, e.g. a racemic mixture of L- and D-glufosinate.

If the glufosinate or a salt thereof is a racemic mixture of L- and D-glufosinate, it is preferably present in the formulation in an amount of 20.0 to 50.0 wt.-%, based on the total weight of the formulation. In particular, if the glufosinate or a salt thereof is a racemic mixture of L- and D-glufosinate, it may be present in the formulation in an amount of 24.0 to 48.0 wt.-%, preferably of 28.0 to 45.0 wt.-%, more preferably of 30.0 to 42.0 wt.-%, and in particular of 32.0 to 40.0 wt.-%, based on the total weight of the formulation.

If the glufosinate or a salt thereof is L-glufosinate or a salt thereof, it is preferably present in the formulation in an amount of 8.0 to 28.0 wt.-% based on the total weight of the formulation. In particular, if the glufosinate or a salt thereof is L-glufosinate or a salt thereof, it may be present in the formulation in an amount of 12.0 to 28.0 wt.-%, preferably of 14.0 to 25.0 wt.-%, more preferably of 15.0 to 22.0 wt.-%, and in particular of 16.0 to 20.0 wt.-%, based on the total weight of the formulation.

Thus, in one preferred embodiment, the glufosinate or the salt thereof is present in the formulation in an amount of 24.0 to 48.0 wt.-%, preferably of 28.0 to 45.0 wt.-%, more preferably of 30.0 to 42.0 wt.-%, and in particular of 32.0 to 40.0 wt.-%, based on the total weight of the formulation.

In another preferred embodiment, the glufosinate or the salt thereof is L-glufosinate or the salt thereof, which is preferably present in the formulation in an amount of 8.0 to 28.0 wt.-% based on the total weight of the formulation.

In another preferred embodiment, the glufosinate or the salt thereof is L-glufosinate or the salt thereof, which is preferably present in the formulation in an amount of 12.0 to 28.0 wt.-%, preferably of 14.0 to 25.0 wt.-%, more preferably of 15.0 to 22.0 wt.-%, and in particular of 16.0 to 20.0 wt.-%, based on the total weight of the formulation.

In a preferred embodiment, the glufosinate or the salt thereof is glufosinate ammonium, preferably L-glufosinate ammonium. Thus, in a particular preferred embodiment, the formulation of the present invention comprises L-glufosinate ammonium in an amount of 8.0 to 28.0 wt.-% based on the total weight of the formulation. In another particular preferred embodiment, the formulation comprises L-glufosinate ammonium in an amount of 12.0 to 28.0 wt.-%, preferably of 14.0 to 25.0 wt.-%, more preferably of 15.0 to 22.0 wt.-%, and in particular of 16.0 to 20.0 wt.-%, based on the total weight of the formulation. In another particularly preferred embodiment, the formulation comprises racemic glufosinate ammonium in an amount of 20.0 to 50.0 wt.-% based on the total weight of the formulation. In another particularly preferred embodiment, the formulation comprises racemic glufosinate ammonium in an amount of 24.0 to 48.0 wt.-%, preferably of 28.0 to 45.0 wt.-%, more preferably of 30.0 to 42.0 wt.-%, and in particular of 32.0 to 40.0 wt.-%, based on the total weight of the formulation.

As indicated above, the alkyl ether sulfate may be present in the formulation in an amount of 19.0 to 50.0 wt.-%. In one preferred embodiment, the alkyl ether sulfate is present in the formulation in an amount from 19.0 to 40.0 wt.-%, based on the total weight of the formulation.

In another preferred embodiment, the alkyl ether sulfate is present in the formulation in an amount of 19.0 to 38.0 wt.-%, preferably of 19.5 to 35.0 wt.-%, more preferably of 20.0 to 30.0 wt.-%, and in particular of 22.0 to 28.0 wt.-%, based on the total weight of the formulation.

In another preferred embodiment, the alkyl ether sulfate is lauryl ether sulfate.

In another preferred embodiment, the 1-methoxy-2-propanol is present in the formulation in an amount of 3.0 to 9.0 wt.-%, preferably of 4.0 to 8.0 wt.-%, more preferably of 4.0 to 7.0 wt.-%, and in particular of 5.0 to 6.0 wt.-%, based on the total weight of the formulation.

In another preferred embodiment, the dipropylene glycol is present in the formulation in an amount of 5.0 to 13.0 wt.-%, preferably of 6.0 to 13.0 wt.-%, more preferably of 7.0 to 11.0 wt.-%, and in particular of 7.0 to 9.5 wt.-%, based on the total weight of the formulation.

In another preferred embodiment, the alkyl polysaccharide is present in the formulation in an amount of 5.0 to 18.0 wt.-%, preferably of 6.0 to 15.0 wt.-%, more preferably of 6.5 to 13.0 wt.-%, and in particular of 7.0 to 12.0 wt.-%, based on the total weight of the formulation.

In another preferred embodiment, the formulation of the present invention comprises 14.0 to 25.0 wt.-% of L-glufosinate or a salt thereof,
19.0 to 35.0 wt.-% of alkyl ether sulfate,
4.0 to 8.0 wt.-% of 1-methoxy-2-propanol,
6.0 to 13.0 wt.-% of dipropylene glycol, and
6.0 to 18.0 wt.-% of alkyl polysaccharide,
each based on the total weight of the formulation, and wherein water is present as the balance of the formulation.

In another preferred embodiment, the alkyl ether sulfate is expressed by the general formula (I)

$$R^1\text{—}O(CH_2CH_2O)n\text{—}SO_3M, \quad (I)$$

wherein $R^1$ is saturated or unsaturated C4-C24-alkyl, preferably C6-C20-alkyl, and in particular C12-C14-alkyl, n is an average number of 1 to 30, preferably of 1 to 10, more preferably of 1 to 5, and M is monoethanolamine, triethanolammonium, Na+, K+ or $NH_4$+, preferably monoethanolamine or sodium, and in particular wherein the alkyl ether sulfate is sodium lauryl ether sulfate.

In another preferred embodiment, the alkyl polysaccharide is expressed by the general formula (II)

$$R^2\text{—}O\text{—}(G)_g\text{—}H, \quad (II)$$

wherein $R^2$ is saturated or unsaturated C4-C24-alkyl, preferably C6-C20-alkyl, and in particular C8-C10-alkyl or C8-C14-alkyl or C12-C14-alkyl, G is a glucose moiety, preferably connected via the C1 and C4 carbon atom, and g is an average number of 1 to 50, preferably of 5 to 20, and in particular wherein the alkyl polysaccharide is alkyl polyglucoside.

Furthermore, the present invention relates to the use of 1-methoxy-2-propanol to improve the cold stability of a formulation comprising glufosinate or a salt thereof, alkyl ether sulfate, dipropylene glycol, alkyl polysaccharide, and water.

In a preferred embodiment of said use, the formulation comprises 3.0 to 10.0 wt.-% of the 1-methoxy-2-propanol, based on the total weight of the formulation.

Furthermore, the present invention relates to a method for selectively controlling weeds in an area comprising applying an effective amount of the formulation as defined herein, in particular as defined above, to the field.

In a first aspect, the present invention relates to a formulation comprising 20.0 to 50.0 wt.-% of glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In the following, preferred embodiments of the components of the formulation are described in further detail. It is to be understood that each preferred embodiment is relevant on its own as well as in combination with other preferred embodiments.

In a preferred embodiment A1 of the first aspect, the glufosinate or the salt thereof is present in the formulation in an amount of 24.0 to 48.0 wt.-%, preferably of 28.0 to 45.0 wt.-%, more preferably of 30.0 to 42.0 wt.-%, and in particular of 32.0 to 40.0 wt.-%, based on the total weight of the formulation.

In a preferred embodiment A2 of the first aspect, the glufosinate or the salt thereof is L-glufosinate or the salt thereof, which is preferably present in the formulation in an amount of 12.0 to 28.0 wt.-%, preferably of 14.0 to 25.0 wt.-%, more preferably of 15.0 to 22.0 wt.-%, and in particular of 16.0 to 20.0 wt.-%, based on the total weight of the formulation.

In a preferred embodiment A3 of the first aspect, the glufosinate or the salt thereof is glufosinate ammonium, preferably L-glufosinate ammonium.

In a preferred embodiment A4 of the first aspect, the alkyl ether sulfate is present in the formulation in an amount of 19.0 to 38.0 wt.-%, preferably of 19.5 to 35.0 wt.-%, more preferably of 20.0 to 30.0 wt.-%, and in particular of 22.0 to 28.0 wt.-%, based on the total weight of the formulation.

In a preferred embodiment A5 of the first aspect, the 1-methoxy-2-propanol is present in the formulation in an amount of 3.0 to 9.0 wt.-%, preferably of 4.0 to 8.0 wt.-%, more preferably of 4.0 to 7.0 wt.-%, and in particular of 5.0 to 6.0 wt.-%, based on the total weight of the formulation.

In a preferred embodiment A6 of the first aspect, the dipropylene glycol is present in the formulation in an amount of 5.0 to 13.0 wt.-%, preferably of 6.0 to 13.0 wt.-%, more preferably of 7.0 to 11.0 wt.-%, and in particular of 7.0 to 9.5 wt.-%, based on the total weight of the formulation.

In a preferred embodiment A7 of the first aspect, the alkyl polysaccharide is present in the formulation in an amount of 5.0 to 18.0 wt.-%, preferably of 6.0 to 15.0 wt.-%, more preferably of 6.5 to 13.0 wt.-%, and in particular of 7.0 to 12.0 wt.-%, based on the total weight of the formulation.

In a preferred embodiment A8 of the first aspect, the formulation comprises 14.0 to 25.0 wt.-% of L-glufosinate or a salt thereof,
19.0 to 35.0 wt.-% of alkyl ether sulfate,
4.0 to 8.0 wt.-% of 1-methoxy-2-propanol,
6.0 to 13.0 wt.-% of dipropylene glycol, and
6.0 to 18.0 wt.-% of alkyl polysaccharide,
each based on the total weight of the formulation, and wherein water is present as the balance of the formulation.

In a preferred embodiment A9 of the first aspect, the alkyl ether sulfate is expressed by the general formula (I)

$$R^1\text{—}O(CH2CH2O)n\text{—}SO3M, \quad (I)$$

wherein R1 is saturated or unsaturated C4-C24-alkyl, preferably C6-C20-alkyl, and in particular C12-C14-alkyl, n is an average number of 1 to 30, preferably of 1 to 10, more preferably of 1 to 5, and M is monoethanolamine, triethanolammonium, Na+, K+ or NH4+, preferably monoethanolamine or sodium, and in particular wherein the alkyl ether sulfate is sodium lauryl ether sulfate.

In a preferred embodiment A10 of the first aspect, the alkyl polysaccharide is expressed by the general formula (II)

$$R2—O—(G)_g—H, \quad (II)$$

wherein R2 is saturated or unsaturated C4-C24-alkyl, preferably C6-C20-alkyl, and in particular C8-C10-alkyl or C8-C14-alkyl or C12-C14-alkyl, G is a glucose moiety, preferably connected via the C1 and C4 carbon atom, and g is an average number of 1 to 50, preferably of 5 to 20, and in particular wherein the alkyl polysaccharide is alkyl polyglucoside.

In a second aspect, the present invention relates to the use of 1-methoxy-2-propanol to improve the cold stability of a formulation comprising glufosinate or a salt thereof, alkyl ether sulfate, dipropylene glycol, alkyl polysaccharide, and water.

In a preferred embodiment B1 of the second aspect, the formulation comprises 3.0 to 10.0 wt.-% of the 1-methoxy-2-propanol, based on the total weight of the formulation.

In a third aspect, the present invention relates to a method for selectively controlling weeds in an area comprising applying an effective amount of the formulation as defined herein to the field.

DETAILED DESCRIPTION

Before describing in detail exemplary embodiments of the present invention, definitions important for understanding the present invention are given.

As used in this specification and in the appended claims, the singular forms of "a" and "an" also include the respective plurals unless the context clearly dictates otherwise. In the context of the present invention, the terms "about" and "approximately" denote an interval of accuracy that a person skilled in the art will understand to still ensure the technical effect of the feature in question. The term typically indicates a deviation from the indicated numerical value of ±10%, preferably ±5%, more preferably ±3%, still more preferably ±1%. It is to be understood that the term "comprising" is not limiting. For the purposes of the present invention the term "consisting of" is considered to be a preferred embodiment of the term "comprising of". If hereinafter a group is defined to comprise at least a certain number of embodiments, this is meant to also encompass a group which preferably consists of these embodiments only. Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(a)", "(b)", "(c)", "(d)", "i", "ii" etc. relate to steps of a method or use or assay there is no time or time interval coherence between the steps, i.e. the steps may be carried out simultaneously or there may be time intervals of seconds, minutes, hours, days, weeks, months or even years between such steps, unless otherwise indicated in the application as set forth herein above or below. It is to be understood that this invention is not limited to the particular methodology, protocols, reagents etc. described herein as these may vary. It is also to be understood that the terminology used herein is for the purpose of describing particular embodiments only, and is not intended to limit the scope of the present invention that will be limited only by the appended claims. Unless defined otherwise, all technical and scientific terms used herein have the same meanings as commonly understood by one of ordinary skill in the art.

The term "wt.-%" as used throughout herein stands for "percent by weight".

The prefix $C_n$-$C_m$ indicates in each case the possible number of carbon atoms in the group.

The term "alkyl" as used herein denotes in each case a straight-chain or branched alkyl group having usually from 1 to 24 carbon atoms, preferably from 1 to 10 carbon atoms, frequently from 1 to 6 carbon atoms, more preferably 1 to 4 carbon atoms, e.g. 3 or 4 carbon atoms. Examples of alkyl groups are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Preferred alkyl groups are methyl, ethyl, n-propyl, isopropyl, n-butyl, isobutyl, sec-butyl, tert-butyl, n-pentyl, isopentyl, neopentyl, tert-pentyl, hexyl, 2-methylpentyl, n-heptyl, n-octyl, 2-ethylhexyl, isooctyl, nonyl, isononyl, decyl, and isodecyl.

The term "at least one" as used throughout herein above and below means one or more, preferably one or two, and thus typically refers individual compounds or mixtures/combinations.

When referring to compositions and the weight percent of the therein comprised ingredients it is to be understood that according to the present invention the overall amount of ingredients does not exceed 100% (±1% due to rounding).

Unless explicitly indicated otherwise the invention preferably encompasses all stereoisomers, i.e. pure enantiomers, pure diastereomers, of the compounds according to the invention, and their mixtures, including racemic mixtures. In particular, in connection with glufosinate, it is to be understood that the term preferably encompasses the pure enantiomers L-glufosinate and D-glufosinate, and any mixtures thereof, including, e.g., mixtures containing an enantiomeric excess (ee) of L-glufosinate, for example at least 99% ee or 99.5% ee, as well as racemic mixtures.

Preferred embodiments regarding the glufosinate-containing formulation, the use of 1-methoxy-2-propanol, and the method for selectively controlling weeds are described in detail hereinafter. It is to be understood that the preferred embodiments of the invention are preferred alone or in combination with each other.

As indicated above, the present invention relates to a formulation comprising 8.0 to 50.0 wt.-% of glufosinate or a salt thereof,
19.0 to 50.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water, each based on the total weight of the formulation.

In particular, the present invention relates to a formulation comprising 12.0 to 50.0 wt.-% of glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

As indicated above, the present invention relates in one aspect to a formulation comprising 20.0 to 50.0 wt.-% of glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In this connection, it is preferred that the glufosinate or the salt thereof is a racemic mixture of D- and L-glufosinate.

In another aspect, the present invention relates to a formulation comprising 8.0 to 28.0 wt.-% of glufosinate or a salt thereof,
19.0 to 50.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In this connection, it is preferred that the glufosinate or the salt thereof is L-glufosinate or a salt thereof, in particular L-glufosinate ammonium.

Thus, in one embodiment, the present invention relates to a formulation comprising 8.0 to 28.0 wt.-% of L-glufosinate or a salt thereof,
19.0 to 50.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

Particularly preferably the L-glufosinate or a salt thereof is L-glufosinate ammonium.

In another aspect, the present invention relates to a formulation comprising 8.0 to 28.0 wt.-% of glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In this connection, it is preferred that the glufosinate or the salt thereof is L-glufosinate or a salt thereof, in particular L-glufosinate ammonium.

Thus, in one embodiment, the present invention relates to a formulation comprising 8.0 to 28.0 wt.-% of L-glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

Particularly preferably the L-glufosinate or a salt thereof is L-glufosinate ammonium.

In yet another aspect, the present invention relates to a formulation comprising 12.0 to 28.0 wt.-% of glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In this connection, it is preferred that the glufosinate or the salt thereof is L-glufosinate or a salt thereof, in particular L-glufosinate ammonium.

Thus, in one embodiment, the present invention relates to a formulation comprising 12.0 to 28.0 wt.-% of L-glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In a preferred embodiment, the present invention relates to a formulation comprising 14.0 to 25.0 wt.-% of L-glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In a more preferred embodiment, the present invention relates to a formulation comprising 15.0 to 22.0 wt.-% of L-glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

In a still more preferred embodiment, the present invention relates to a formulation comprising 16.0 to 20.0 wt.-% of L-glufosinate or a salt thereof,
19.0 to 40.0 wt.-% of an alkyl ether sulfate,
3.0 to 10.0 wt.-% of 1-methoxy-2-propanol,
4.0 to 15.0 wt.-% of dipropylene glycol,
4.0 to 20.0 wt.-% of an alkyl polysaccharide, and
20.0 to 50.0 wt.-% of water,
each based on the total weight of the formulation.

Particularly preferably the L-glufosinate or a salt thereof is L-glufosinate ammonium.

It is to be understood that the glufosinate or a salt thereof encompasses all stereoisomers and mixtures thereof and suitable salts of the respective glufosinate. Suitable salts are exemplarily hydrochloric acid salt, ammonium salts, and isopropylammonium salts. In this connection, the term glufosinate or a salt thereof in particular encompasses two stereocenters, wherein one stereocenter is located at the phosphor atom and one stereocenter is located at the alpha carbon atom. It is to be understood that the term glufosinate or a salt thereof encompasses all stereoisomers.

Racemic glufosinate has the formula (1)

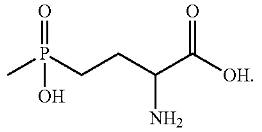

(1)

In a preferred embodiment, the glufosinate or the salt thereof is present in the formulation in an amount of 24.0 to 48.0 wt.-%, preferably of 28.0 to 45.0 wt.-%, more preferably of 30.0 to 42.0 wt.-%, and in particular of 32.0 to 40.0 wt.-%, based on the total weight of the formulation.

In a preferred embodiment, the glufosinate or the salt thereof is a racemic mixture thereof, which is present in the formulation in an amount of 24.0 to 48.0 wt.-%, preferably of 28.0 to 45.0 wt.-%, more preferably of 30.0 to 42.0 wt.-%, and in particular of 32.0 to 40.0 wt.-%, based on the total weight of the formulation.

In a preferred embodiment, the glufosinate or the salt thereof is D-glufosinate or the salt thereof, which is preferably present in the formulation in an amount of 12.0 to 28.0 wt.-%, preferably of 14.0 to 25.0 wt.-%, more preferably of 15.0 to 22.0 wt.-%, even more preferably of 15.5 to 21.0 wt.-%, and in particular of and in particular of 16.0 to 20.0 wt.-%, based on the total weight of the formulation.

In a preferred embodiment, the glufosinate or the salt thereof is L-glufosinate or the salt thereof, which is preferably present in the formulation in an amount of 12.0 to 28.0 wt.-%, preferably of 14.0 to 25.0 wt.-%, more preferably of 15.0 to 22.0 wt.-%, even more preferably of 15.5 to 21.0 wt.-%, and in particular of 16.0 to 20.0 wt.-%, based on the total weight of the formulation.

The glufosinate or a salt thereof may be provided as aqueous solution.

In a preferred embodiment, the glufosinate or the salt thereof is racemic glufosinate ammonium.

In a preferred embodiment, the glufosinate or the salt thereof is D-glufosinate ammonium.

In a preferred embodiment, the glufosinate or the salt thereof is glufosinate ammonium, preferably L-glufosinate ammonium.

In a particular embodiment, the glufosinate or the salt thereof is glufosinate ammonium, preferably L-glufosinate ammonium, which is present in the formulation in an amount of 12.0 to 28.0 wt.-%, preferably of 14.0 to 25.0 wt.-%, more preferably of 15.0 to 22.0 wt.-%, even more preferably of 15.5 to 21.0 wt.-%, and in particular of 16.0 to 20.0 wt.-%, based on the total weight of the formulation.

In a preferred embodiment, the alkyl ether sulfate is present in the formulation in an amount of 19.0 to 38.0 wt.-%, preferably of 19.5 to 35.0 wt.-%, more preferably of 20.0 to 30.0 wt.-%, even more preferably of 22.0 to 28.0 wt.-%, and in particular of 23.0 to 28.0 wt.-%, based on the total weight of the formulation.

In a preferred embodiment, the 1-methoxy-2-propanol is present in the formulation in an amount of 3.0 to 9.0 wt.-%, preferably of 4.0 to 8.0 wt.-%, more preferably of 4.0 to 7.0 wt.-%, even more preferably of 4.5 to 6.5 wt.-%, and in particular of 5.0 to 6.0 wt.-%, based on the total weight of the formulation.

In another preferred embodiment, the formulation comprises 4.5 to 10.0 wt.-%, preferably 5.0 to 9.0 wt.-%, more preferably of 6.0 to 8.0 wt.-%, in particular of 7.0 to 8.0 wt.-%, of 1-methoxy-2-propanol, based on the total weight of the formulation.

In a preferred embodiment, the dipropylene glycol is present in the formulation in an amount of 5.0 to 13.0 wt.-%, preferably of 6.0 to 13.0 wt.-%, more preferably of 7.0 to 11.0 wt.-%, even more preferably of 7.0 to 9.5 wt.-%, and in particular of 8.0 to 9.5 wt.-%, based on the total weight of the formulation.

In a preferred embodiment, the alkyl polysaccharide is present in the formulation in an amount of 5.0 to 18.0 wt.-%, preferably of 6.0 to 15.0 wt.-%, more preferably of 6.5 to 13.0 wt.-%, even more preferably of 7.0 to 12.0 wt.-%, and in particular of 7.5 to 10.0 wt.-%, based on the total weight of the formulation.

In a preferred embodiment, the formulation comprises
- 14.0 to 25.0 wt.-% of L-glufosinate or a salt thereof, preferably L-glufosinate ammonium,
- 19.0 to 35.0 wt.-% of alkyl ether sulfate,
- 4.0 to 8.0 wt.-% of 1-methoxy-2-propanol,
- 6.0 to 13.0 wt.-% of dipropylene glycol, and
- 6.0 to 18.0 wt.-% of alkyl polysaccharide, each based on the total weight of the formulation, and wherein water is present as the balance of the formulation.

In a preferred embodiment, the formulation comprises
- 14.0 to 25.0 wt.-% of L-glufosinate or a salt thereof, preferably L-glufosinate ammonium,
- 19.0 to 35.0 wt.-% of alkyl ether sulfate,
- 4.0 to 8.0 wt.-% of 1-methoxy-2-propanol,
- 6.0 to 13.0 wt.-% of dipropylene glycol,
- 6.0 to 18.0 wt.-% of alkyl polysaccharide, and
- 14.0 to 25.0 wt.-% of water, each based on the total weight of the formulation, and wherein water is present as the balance of the formulation.

In a preferred embodiment, the formulation comprises
- 16.0 to 22.0 wt.-% of L-glufosinate or a salt thereof, preferably L-glufosinate ammonium,
- 22.0 to 28.0 wt.-% of alkyl ether sulfate,
- 4.5 to 7.0 wt.-% of 1-methoxy-2-propanol,
- 7.0 to 12.0 wt.-% of dipropylene glycol,
- 7.0 to 12.0 wt.-% of alkyl polysaccharide, and
- 16.0 to 22.0 wt.-% of water, each based on the total weight of the formulation, and wherein water is present as the balance of the formulation.

Preferably, the formulation comprises the glufosinate or the salt thereof and the alkyl ether sulfate in a weight ratio of 4:1 to 1:5, preferably of 2:1 to 1:3, more preferably of 1:1 to 1:2.

Preferably, the formulation comprises the glufosinate or the salt thereof and the 1-methoxy-2-propanol in a weight ratio of 10:1 to 1-2, preferably of 8:1 to 1:1, more preferably of 5:1 to 2:1.

Preferably, the formulation comprises the glufosinate or the salt thereof and the dipropylene glycol in a weight ratio of 8:1 to 1:2, preferably of 6:1 to 1:1, more preferably of 3:1 to 1:1.

Preferably, the formulation comprises the glufosinate or the salt thereof and the alkyl polysaccharide in a weight ratio of 8:1 to 1:2, preferably of 6:1 to 1:1, more preferably of 4:1 to 1:1.

Preferably, the formulation comprises the glufosinate or the salt thereof and the water in a weight ratio of 4:1 to 1:4, preferably of 2:1 to 1-2, more preferably of 1.5:1 to 1:1.5.

Preferably, the formulation comprises the alkyl ether sulfate and the alkyl polysaccharide in a weight ratio of 10:1 to 1:2, preferably of 5:1 to 1:1, more preferably of 4:1 to 2:1.

Alkyl ether sulfates are generally defined as salts of sulfated adducts of ethylene oxide with fatty alcohols containing 4 to 24, preferably 6 to 20, more preferably 6 to 16 carbon atoms. Preferably, the alkyl ether sulfates used herein contain a linear aliphatic group having from 4 to 24, preferably 6 to 20, more preferably 6 to 16, in particular 12 to 16 carbon atoms. The degree of ethylene oxide may be from 1 to 10 moles of ethylene oxide, usually 2 to 4 moles of ethylene oxide. Examples include sodium lauryl ether sulfate, ammonium lauryl ether sulfate, and other lauryl ether sulfate.

In a preferred embodiment, the alkyl ether sulfate is expressed by the general formula (I)

$$R1—O(CH2CH2O)n—SO3M, \quad (I)$$

wherein R1 is saturated or unsaturated C4-C24-alkyl, preferably C6-C20-alkyl, and in particular C12-C14-alkyl, n is an average number of 1 to 30, preferably of 1 to 10, more preferably of 1 to 5, and M is monoethanolamine, triethanolammonium, Na+, K+ or NH4+, preferably monoethanolamine or sodium, and in particular wherein the alkyl ether sulfate is sodium lauryl ether sulfate.

The alkyl ether sulfate may be provided as aqueous solution, preferably comprising the alkyl ether sulfate from 50 to 90 wt.-%, more preferably from 60 to 80 wt.-%, and in particular from 65 to 75 wt.-%, based on the total weight of the aqueous solution.

In a preferred embodiment, the alkyl polysaccharide is expressed by the general formula (II)

$$R2—O—(G)_g—H, \quad (II)$$

wherein R2 is saturated or unsaturated C4-C24-alkyl, preferably C6-C20-alkyl, and in particular C8-C10-alkyl or C8-C14-alkyl or C12-C14-alkyl, G is a glucose moiety, preferably connected via the C1 and C4 carbon atom, and g is an average number of 1 to 50, preferably of 5 to 20, and in particular wherein the alkyl polysaccharide is alkyl polyglucoside (also known as alkyl polyglycoside or APG).

In a preferred embodiment, the alkyl polysaccharide is an alkyl polyglycoside, which may be expressed by the general formula (IIa)

$$R2aO(R2bO)b(Z)a \quad (IIa)$$

wherein R2a is a monovalent organic radical having from 6 to 30 carbon atom; R2b is a divalent alkylene radical having from 2 to 4 carbon atoms; Z is a glucose residue having 5 or 6 carbon atoms; b is a number ranging from 0 to 12; and a is a number ranging from 1 to 6. Non limiting examples of commercially available alkyl polyglycoside include, for examples, APG®, AGNIQUE®, or AGRIMUL® surfactants from BASF; Croda; Nouryon, such as:

1. AGNIQUE PG 8105 Surfactant—an alkyl polyglucoside in which the alkyl group contains 8 to 10 carbon atoms and having an average degree of polymerization of 1.5.
2. AGNIQUE PG 8166 Surfactant—an alkyl polyglucoside in which the alkyl group contains 8 to 16 carbon atoms and having an average degree of polymerization of 1.6.
3. AGNIQUE PG 266 Surfactant—an alkyl polyglucoside in which the alkyl group contains 12 to 16 carbon atoms and having an average degree of polymerization of 1.6.
4. AGNIQUE PG 9116 Surfactant—an alkyl polyglucoside in which the alkyl group contains 9 to 11 carbon atoms and having an average degree of polymerization of 1.6.
5. AGNIQUE PG 264-U Surfactant—an alkyl polyglucoside in which the alkyl group contains 12 to 16 carbon atoms and having an average degree of polymerization of 1.4.
6. AGNIQUE PG 8107 Surfactant—a C8-16 alkyl polyglucoside in which the alkyl group contains 8 to 10 carbon atoms and having an average degree of polymerization of 1.7.
7. AGNIQUE PG 266 Surfactant—a C12-16 alkyl polyglucoside in which the alkyl group contains 12 to 16 carbon atoms and having an average degree of polymerization of 1.6.
8. AL 2575/AL 535 Surfactant—a C8-11 alkyl polyglucoside in which the alkyl group contains 8 to 11 carbon atoms and having a HLB 12-13.
9. Nouryon AG 6202, AG 6206, or AG 6210 surfactants which are 2 ethylhexyl branched C8; linear hexyl C6; and linear C8-C10 alkyl polyglucosides respectively.

The alkyl polyglucoside may typically comprise a C8-C16 alkyl polyglucoside. In a preferred embodiment, alkyl polyglucoside of formula (IIa) is used, wherein R2a is a monovalent organic radical having from 8 to 10 carbon atoms; b is zero; and a is a number having a value from 1 to 3, typically 1.5 to 1.7, often 1.6.

The alkyl polysaccharide may be provided as aqueous solution, preferably comprising the alkyl polysaccharide from 40 to 80 wt.-%, more preferably from 50 to 70 wt.-%, and in particular from 55 to 65 wt.-%, based on the total weight of the aqueous solution.

In a preferred embodiment, the formulation has a flash point (determined according to CIPAC, MT 12—Flash Point, Handbook F; cipac.org/index.php/f12/364-mt-12-flash-point) of more than 90° C., preferably more than 100° C., and in particular more than 110° C. In this connection, the flash point according to CIPAC, MT 12—Flash Point, Handbook F is determined as follows: The sample is placed in the cup of the apparatus and heated at a slow, uniform rate. A small test flame is directed into the cup at regular intervals, and the flash point taken as the lowest temperature at which the application of the flame causes the vapour above the sample to ignite with a distinct flash inside the cup.

In a preferred embodiment, the formulation has a density (determined according to OECD Test Guideline 109) of 1.110 to 1.140 g/cm$^3$, preferably of 1.115 to 1.135 g/cm$^3$, and in particular of 1.120 to 1.130 g/cm$^3$.

In a preferred embodiment, the formulation further comprises at least one additional component, such as an antifoam agent, a wetting agent, a dispersant, an emulsifier, a penetrant, a preservative, an antifreeze and evaporation inhibitor such as glycerol and ethylene or propylene glycol, sorbitol, sodium lactate, a filler, a carrier, a colorant including pigments and/or dyes, a pH modifier (buffers, acids, and bases), salts such as calcium, magnesium, ammonium, potassium, sodium, and/or iron chlorides, and combinations thereof.

The pigments or dyes can be any available color are typically considered non-hazardous. In some embodiments, the dye is present in less than about 1 wt.-%, or less than about 2 wt.-%, or less than about 3 wt.-%, or of about 0.01 to 2 wt.-%, or of about 0.01 to 1 wt.-%, based on the total amount of the formulation.

Formulations described herein can also contain other additaments, for example, fertilizers, phytotoxicants and plant growth regulants, pesticides, and the like used as adjuvants or in combination with any of the above-described adjuvants. The compositions described herein can also be admixed with the other materials, e.g., fertilizers, other phytotoxicants, etc., and applied in a single application.

It is recognized that the herbicidal formulation can be used in combination with other herbicides. The herbicidal formulation of the present invention is often applied in conjunction with one or more other herbicides to control a wider variety of undesirable vegetation. When used in conjunction with other herbicides, the presently claimed formulation can be formulated with the other herbicide or herbicides, tank mixed with the other herbicide or herbicides or applied sequentially with the other herbicide or herbicides. Some of the herbicides that can be employed in conjunction with the formulation of the present invention include: amide herbicides such as allidochlor, beflubutamid, benzadox, benzipram, bromobutide, cafenstrole, CDEA, chlorthiamid, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam; anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil; arylalanine herbicides such as benzoylprop, flamprop and flamprop-M; chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor; sulfonanilide herbicides such as benzofluor, perfluidone, pyrimisulfan and profluazol; sulfonamide herbicides such as asulam, carbasulam, fenasulam and oryzalin; antibiotic herbicides such as bilanafos; benzoic acid herbicides such as chloramben, dicamba, 2,3,6-TBA and tricamba; pyrimidinyloxybenzoic acid herbicides such as bispyribac and pyriminobac; pyrimidinylthiobenzoic acid herbicides such as pyrithiobac; phthalic acid herbicides such as chlorthal; picolinic acid herbicides such as aminopyralid, clopyralid and picloram; quinolinecarboxylic acid herbicides such as quinclorac and quinmerac; arsenical herbicides such as cacodylic acid, CMA, DSMA, hexaflurate, MAA, MAMA, MSMA, potassium arsenite and sodium arsenite; benzoylcyclohexanedione herbicides such as mesotrione, sulcotrione, tefuryltrione and tembotrione; benzofuranyl alkylsulfonate herbicides such as benfuresate and ethofumesate; carbamate herbicides such as asulam, carboxazole chlorprocarb, dichlormate, fenasulam, karbutilate and terbucarb; carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep; cyclohexene oxime herbicides such as alloxydim, butroxydim, clethodim, cloproxydim, cycloxydim, profoxydim, sethoxydim, tepraloxydim and tralkoxydim; cyclopropylisoxazole herbicides such as isoxachlortole and isoxaflutole; dicarboximide herbicides such as benzfendizone, cinidon-ethyl, flumezin, flumiclorac, flumioxazin and flumipropyn; dinitroaniline herbicides such as benfluralin, butralin, dinitramine, ethalfluralin, fluchloralin, isopropalin, methalpropalin, nitralin, oryzalin, pendimethalin, prodiamine, profluralin and trifluralin; dinitrophenol herbicides such as dinofenate, dinoprop, dinosam, dinoseb, dinoterb, DNOC, etinofen and medinoterb; diphenyl ether herbicides such as ethoxyfen; nitrophenyl ether herbicides such as acifluorfen, aclonifen, bifenox, chlomethoxyfen, chlomitrofen, etnipromid, fluorodifen, fluoroglycofen, fluoronitrofen, fomesafen, furyloxyfen, halosafen, lactofen, nitrofen, nitrofluorfen and oxyfluorfen; dithiocarbamate herbicides such as dazomet and metam; halogenated aliphatic herbicides such as alorac, chloropon, dalapon, flupropanate, hexachloroacetone, iodomethane, methyl bromide, monochloroacetic acid, SMA and TCA; imidazolinone herbicides such as imazamethabenz, imazamox, imazapic, imazapyr, imazaquin and imazethapyr; inorganic herbicides such as ammonium sulfamate, borax, calcium chlorate, copper sulfate, ferrous sulfate, potassium azide, potassium cyanate, sodium azide, sodium chlorate and sulfuric acid; nitrile herbicides such as bromobonil, bromoxynil, chloroxynil, dichlobenil, iodobonil, ioxynil and pyraclonil; organophosphorus herbicides such as amiprofos-methyl, anilofos, bensulide, bilanafos, butamifos, 2,4-DEP, DMPA, EBEP, fosamine, glyphosate and piperophos; phenoxy herbicides such as bromofenoxim, clomeprop, 2,4-DEB, 2,4-DEP, difenopenten, disul, erbon, etnipromid, fenteracol and trifopsime; phenoxyacetic herbicides such as 4-CPA, 2,4-D, 3,4-DA, MCPA, MCPA-thioethyl and 2,4,5-T; phenoxybutyric herbicides such as 4-CPB, 2,4-DB, 3,4-DB, MCPB and 2,4,5-TB; phenoxypropionic herbicides such as cloprop, 4-CPP, dichlorprop, dichlorprop-P, 3,4-DP, fenoprop, mecoprop and mecoprop-P; aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop; phenylenediamine herbicides such as dinitramine and prodiamine; pyrazolyl herbicides such as benzofenap, pyrazolynate, pyrasulfotole, pyrazoxyfen, pyroxasulfone and topramezone; pyrazolylphenyl herbicides such as fluazolate and pyraflufen; pyridazine herbicides such as credazine, pyridafol and pyridate; pyridazinone herbicides such as brompyrazon, chloridazon, dimidazon, flufenpyr, metflurazon, norflurazon, oxapyrazon and pydanon; pyridine herbicides such as aminopyralid, cliodinate, clopyralid, dithiopyr, fluroxypyr, haloxydine, picloram, picolinafen, pyriclor, thiazopyr and triclopyr; pyrimidinediamine herbicides such as iprymidam and tioclorim; quatemary ammonium herbicides such as cyperquat, diethamquat, difenzoquat, diquat, morfamquat and paraquat; thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vemolate; thiocarbonate herbicides such as dimexano, EXD and proxan; thiourea herbicides such as methiuron; triazine herbicides such as dipropetryn, triaziflam and trihydroxytriazine; chlorotriazine herbicides such as atrazine, chlorazine, cyanazine, cyprazine, eglinazine, ipazine, mesoprazine, procyazine, proglinazine, propazine, sebuthylazine, simazine, terbuthylazine and trietazine; methoxytriazine herbicides such as atraton, methometon, prometon, secbumeton, simeton and terbumeton; methylthiotriazine herbicides such as ametryn, aziprotryne, cyanatryn, desmetryn, dimethametryn, methoprotryne, prometryn, simetryn and terbutryn; triazinone herbicides such as ametridione, amibuzin, hexazinone, isomethiozin, metamitron and metribuzin; triazole herbicides such as amitrole, cafenstrole, epronaz and flupoxam; triazolone herbicides such as amicarbazone, bencarbazone, carfentrazone, flucarbazone, propoxycarbazone, sulfentrazone and thiencarbazone-methyl; triazolopyrimidine herbicides such as cloransulam, diclosulam, florasulam, flumetsulam, metosulam, penoxsulam and pyroxsulam; uracil herbicides such as butafenacil, bromacil, flupropacil, isocil, lenacil and terbacil; 3-phenyluracils; urea herbicides such as benzthiazuron, cumyluron, cycluron, dichloralurea, diflufenzopyr, isonoruron, isouron, methabenzthiazuron, monisouron and noruron; phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron and thidiazuron; pyrimidinylsulfonylurea herbicides such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron; triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron; thiadiazolylurea herbicides such as buthiuron, ethidimuron, tebuthiuron, thiazafluron and thidiazuron; and unclassified herbicides such as acrolein, allyl alcohol, aminocyclopyrachlor, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, ortho-dichlorobenzene, dimepiperate, endothal, fluoromidine, fluridone, flurochloridone, flurtamone, fluthiacet, indanofan, methazole, methyl isothiocyanate, nipyraclofen, OCH, oxadiargyl, oxadiazon, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan and tritac. The herbicidal formulation of the present invention can, further, be used in conjunction with glyphosate or 2,4-D on glyphosate-tolerant or 2,4-D-tolerant crops. It is generally preferred to use the formulation of the invention in combination with herbicides that are selective for the crop being treated and which complement the spectrum of weeds controlled by these compositions at the application rate employed. It is further generally preferred to apply the formulation of the invention and other complementary herbicides at the same time, either as a combination formulation or as a tank mix.

Without wishing to be bound to any theory, the inventive formulation has a suitable biological impact, preferably an improved biological impact, when compared to several state of the art formulations.

As indicated above, the present invention relates in a second aspect to the use of 1-methoxy-2-propanol to improve the cold stability of a formulation comprising glufosinate or a salt thereof, alkyl ether sulfate, dipropylene glycol, alkyl polysaccharide, and water.

It is to be understood that all definitions and preferred embodiments as described above shall also hold for the use aspect. Further preferred embodiments are described in detail herein after.

In a preferred embodiment, the formulation comprises 3.0 to 10.0 wt.-%, preferably 3.0 to 9.0 wt.-%, more preferably of 4.0 to 8.0 wt.-%, even more preferably of 4.0 to 7.0 wt.-%, still more preferably of 4.5 to 6.5 wt.-%, and in particular of 5.0 to 6.0 wt.-%, of 1-methoxy-2-propanol, based on the total weight of the formulation.

In another preferred embodiment, the formulation comprises 4.5 to 10.0 wt.-%, preferably 5.0 to 9.0 wt.-%, more preferably of 6.0 to 8.0 wt.-%, in particular of 7.0 to 8.0 wt.-%, of 1-methoxy-2-propanol, based on the total weight of the formulation.

In a preferred embodiment, the formulation comprises 14.0 to 25.0 wt.-% of L-glufosinate or a salt thereof, preferably L-glufosinate ammonium, 19.0 to 35.0 wt.-% of alkyl ether sulfate, 4.0 to 8.0 wt.-% of 1-methoxy-2-propanol, 6.0 to 13.0 wt.-% of dipropylene glycol, 6.0 to 18.0 wt.-% of alkyl polysaccharide, and 14.0 to 25.0 wt.-% of water, each based on the total weight of the formulation, and wherein water is present as the balance of the formulation.

In a preferred embodiment, the formulation comprises 16.0 to 22.0 wt.-% of L-glufosinate or a salt thereof, preferably L-glufosinate ammonium, 22.0 to 28.0 wt.-% of alkyl ether sulfate, 4.5 to 7.0 wt.-% of 1-methoxy-2-propanol, 7.0 to 12.0 wt.-% of dipropylene glycol, 7.0 to 12.0 wt.-% of alkyl polysaccharide, and 16.0 to 22.0 wt.-% of water, each based on the total weight of the formulation, and wherein water is present as the balance of the formulation.

Preferably, the formulation comprises the glufosinate or the salt thereof and the alkyl ether sulfate in a weight ratio of 4:1 to 1:5, preferably of 2:1 to 1:3, more preferably of 1:1 to 1-2.

Preferably, the formulation comprises the glufosinate or the salt thereof and the 1-methoxy-2-propanol in a weight ratio of 10:1 to 1:2, preferably of 8:1 to 1:1, more preferably of 5:1 to 2:1.

Preferably, the formulation comprises the glufosinate or the salt thereof and the dipropylene glycol in a weight ratio of 8:1 to 1:2, preferably of 6:1 to 1:1, more preferably of 3:1 to 1:1.

Preferably, the formulation comprises the glufosinate or the salt thereof and the alkyl polysaccharide in a weight ratio of 8:1 to 1:2, preferably of 6:1 to 1:1, more preferably of 4:1 to 1:1.

Preferably, the formulation comprises the glufosinate or the salt thereof and the water in a weight ratio of 4:1 to 1:4, preferably of 2:1 to 1-2, more preferably of 1.5:1 to 1:1.5.

Preferably, the formulation comprises the alkyl ether sulfate and the alkyl polysaccharide in a weight ratio of 10:1 to 1:2, preferably of 5:1 to 1:1, more preferably of 4:1 to 2:1.

As indicated above, the present invention relates in a third aspect to a method for selectively controlling weeds in an area comprising applying an effective amount of the formulation as defined herein to the field.

It is to be understood that all definitions and preferred embodiments as described above shall also hold for the method for selectively controlling weeds aspect. Further preferred embodiments are described in detail herein after.

The formulations described herein are useful for application to a field of crop plants for the prevention or control of weeds. The formulation may be formulated as a liquid for spraying on a field. The L-glufosinate is provided in the composition in effective amounts. As used herein, effective amount means from about 10 grams active ingredient per hectare to about 1,500 grams active ingredient per hectare, e.g., from about 50 grams to about 400 grams or from about 100 grams to about 350 grams. In some embodiments, the active ingredient is L-glufosinate. For example, the amount of L-glufosinate in the composition can be about 10 grams, about 50 grams, about 100 grams, about 150 grams, about 200 grams, about 250 grams, about 300 grams, about 350 grams, about 400 grams, about 500 grams, about 550 grams, about 600 grams, about 650 grams, about 700 grams, about 750 grams, about 800 grams, about 850 grams, about 900 grams, about 950 grams, about 1,000 grams, about 1,050 grams, about 1,100 grams, about 1,150 grams, about 1,200 grams, about 1,250 grams, about 1,300 grams, about 1,350 grams, about 1,400 grams, about 1,450 grams, or about 1,500 grams L-glufosinate per hectare.

The present invention is further illustrated by the following examples.

Examples

Materials

As L-GA, a 53.7% L-glufosinate ammonium solution in water was used.

As race-GA1, a 50% racemic glufosinate ammonium solution in water was used.

As race-GA2, a 60.2% racemic glufosinate ammonium solution in water was used.

Dowanol PM/Solvenon PM is pure 1-methoxy-2-propanol.

SAG 1572 is an antifoam agent purchased by Momentive Performance Chemicals.

Keystone red 33DPG is a dye (5% Liquid) purchased by Killiken & Company.

Duasyn Acid blue AE 03: water soluble dye was purchased from Clariant GmbH.Agnique PG 8105-G is a 60% alkyl polyglucoside solution in water.

Genapol LRO Paste is a 70% sodium alkyl ether sulfate solution in water. The sodium alkyl ether sulfate comprises sodium lauryl ether sulfate.

Preparation of the Formulations

According to the ratios and components as specified in Table 1, all components except the Genapol LRO Paste were pre-mixed. Genapol LRO Paste was then added to the pre-mix and the resulting mixture was stirred until complete dissolution of the solid and analyzed for the density.

Density was measured according to OECD Test Guideline 109.

TABLE 1

| | Comp. 1 | Comp. 2 | Comp. 3 | Inv. 1 | Inv. 2 | Inv. 3 | Inv. 4 | Inv. 5 |
|---|---|---|---|---|---|---|---|---|
| PM(1) [%] | 1 | 4 | 2 | 4 | 5.3 | 6 | 7 | 8 |
| L-GA [g] | | | 392.92 | 392.92 | 392.92 | 392.92 | 392.92 | 392.92 |
| race-GA1 [g] | 465.12 | | | | | | | |
| race-GA2 [g] | | 560 | | | | | | |
| Dowanol PM/ Solvenon PM [g] | 11.5 | 45.6 | 23.0 | 45.0 | 60.0 | 68.0 | 79.0 | 90.0 |
| Dipropylene glycol [g] | 98.5 | 115.6 | 95.9 | 95.9 | 95.9 | 95.9 | 95.9 | 95.9 |
| SAG 1572 [g] | 0.1 | 0.057 | 0.56 | 0.56 | 0.56 | 0.56 | 0.56 | 0.56 |
| Keystone red 33DPG [g] | 0.9 | 0.68 | 0.89 | 0.89 | 0.89 | 0.89 | 0.89 | 0.89 |
| Agnique PG 8105-G [g] | 112.3 | 123.1 | 147.4 | 147.4 | 147.4 | 147.4 | 147.4 | 147.4 |
| Genapol LRO Paste [g] | 363.2 | 296.4 | 400.0 | 400.0 | 400.0 | 400.0 | 400.0 | 400.0 |
| ad. to 1 L with demineralized water [g] | 98.38 | | 68.33 | 46.33 | 31.33 | 23.33 | 12.33 | 1.33 |
| sum [g] | 1150.0 | 1141.4 | 1129.0 | 1129.0 | 1129.0 | 1129.0 | 1129.0 | 1129.0 |
| density [g/cm$^3$] | | | 1.131 | 1.130 | 1.128 | 1.128 | 1.127 | 1.126 |

(1)denotes the total 1-methoxy-2-propanol amount in the respective formulation;

TABLE 2

| | Comp. 1 | Comp. 2 | Comp. 3 | Inv. 6 | Inv. 7 | Inv. 8 | Inv. 9 | Inv. 10 |
|---|---|---|---|---|---|---|---|---|
| PM(1) [%] | 1 | 4 | 2 | 4 | 5.3 | 6 | 7 | 8 |
| L-GA [g] | | | 392.92 | 392.92 | 392.92 | 392.92 | 392.92 | 392.92 |
| race-GA1 [g] | 465.12 | | | | | | | |
| race-GA2 [g] | | 560 | | | | | | |
| Dowanol PM/ Solvenon PM [g] | 11.5 | 45.6 | 23.0 | 45.0 | 60.0 | 68.0 | 79.0 | 90.0 |
| Dipropylene glycol [g] | 98.5 | 115.6 | 95.9 | 95.9 | 95.9 | 95.9 | 95.9 | 95.9 |
| SAG 1572 [g] | 0.1 | 0.057 | 0.56 | 0.56 | 0.56 | 0.56 | 0.56 | 0.56 |
| Duasyn Acid Blue AE 03 [g] | 0.09 | 0.09 | 0.09 | 0.09 | 0.09 | 0.09 | 0.09 | 0.09 |

TABLE 2-continued

| | Comp. 1 | Comp. 2 | Comp. 3 | Inv. 6 | Inv. 7 | Inv. 8 | Inv. 9 | Inv. 10 |
|---|---|---|---|---|---|---|---|---|
| Agnique PG 8105-G [g] | 112.3 | 123.1 | 147.4 | 147.4 | 147.4 | 147.4 | 147.4 | 147.4 |
| Genapol LRO Paste [g] | 363.2 | 296.4 | 400.0 | 400.0 | 400.0 | 400.0 | 400.0 | 400.0 |
| ad. to 1 L with demineralized water [g] | 98.38 | | 68.33 | 46.33 | 31.33 | 23.33 | 12.33 | 1.33 |
| sum [g] | 1150.0 | 1141.4 | 1129.0 | 1129.0 | 1129.0 | 1129.0 | 1129.0 | 1129.0 |
| density [g/cm$^3$] | | | 1.131 | 1.130 | 1.128 | 1.128 | 1.127 | 1.126 |

(1)denotes the total 1-methoxy-2-propanol amount in the respective formulation;

TABLE 3

| | Comp. 1 | Comp. 2 | Comp. 3 | Inv. 11 | Inv. 12 | Inv. 13 | Inv. 14 | Inv. 15 |
|---|---|---|---|---|---|---|---|---|
| PM(1) [%] | 1 | 4 | 2 | 4 | 5.3 | 6 | 7 | 8 |
| L-GA [g] | | | 392.92 | 392.92 | 392.92 | 392.92 | 392.92 | 392.92 |
| race-GA1 [g] | 465.12 | | | | | | | |
| race-GA2 [g] | | 560 | | | | | | |
| Dowanol PM/ Solvenon PM [g] | 11.5 | 45.6 | 23.0 | 45.0 | 60.0 | 68.0 | 79.0 | 90.0 |
| Dipropylene glycol [g] | 98.5 | 115.6 | 95.9 | 95.9 | 95.9 | 95.9 | 95.9 | 95.9 |
| SAG 1572 [g] | 0.1 | 0.057 | 0.56 | 0.56 | 0.56 | 0.56 | 0.56 | 0.56 |
| Agnique PG 8105-G [g] | 112.3 | 123.1 | 147.4 | 147.4 | 147.4 | 147.4 | 147.4 | 147.4 |
| Genapol LRO Paste [g] | 363.2 | 296.4 | 400.0 | 400.0 | 400.0 | 400.0 | 400.0 | 400.0 |
| ad. to 1L with demineralized water [g] | 98.38 | | 68.33 | 46.33 | 31.33 | 23.33 | 12.33 | 1.33 |
| sum [g] | 1150.0 | 1141.4 | 1129.0 | 1129.0 | 1129.0 | 1129.0 | 1129.0 | 1129.0 |
| density [g/cm$^3$] | | | 1.131 | 1.130 | 1.128 | 1.128 | 1.127 | 1.126 |

(1)denotes the total 1-methoxy-2-propanol amount in the respective formulation;

Formulation Storage Stability

The formulations of table-1 were tested on the respective storage stability at three different temperatures.

The formulations were each filled in a test glass. After one day at 0, −5, or −10° C., a seed crystal of ammonium glufosinate was added into each sample.

TABLE 4

| | | Comp. 1 | Comp. 2 | Comp. 3 | Inv. 1 | Inv. 2 | Inv. 3 | Inv. 4 | Inv. 5 |
|---|---|---|---|---|---|---|---|---|---|
| −10° C. | 1 d | solid | 90% Ph. sep. (f/fl) | solid | 90% Ph. sep. (f/fl) | 90% Ph. sep. (f/fl) | 90% Ph. sep. (f/fl) | opaque + viscous | opaque + viscous |
| | 2 d | solid | 70% Ph. sep. (f/fl) | 90% Ph. sep. (f/fl) | 80% Ph. sep. (f/fl) | 70% Ph. sep. (f/fl) | 80% Ph. sep. (f/fl) | opaque + viscous | opaque + viscous |
| | 3 we | 90% Ph. sep. (f/fl) | 40% Ph. sep. (f/fl) | 70% Ph. sep. (f/fl) | 50% Ph. sep. (f/fl) | 40% Ph. sep. (f/fl) | 40% Ph. sep. (f/fl) | 40% Ph. sep. (f/fl) | 30% Ph. sep. (f/fl) |
| | 4 we | 90% Ph. sep. (f/fl) | 40% Ph. sep. (f/fl) | 70% Ph. sep. (f/fl) | 50% Ph. sep. (f/fl) | 40% Ph. sep. (f/fl) | 40% Ph. sep. (f/fl) | 40% Ph. sep. (f/fl) | 30% Ph. sep. (f/fl) |
| | 4 we + 1 d rt | clear | clear | clear | clear | clear | clear | clear | clear |
| −5° C. | 1 d | solid | clear | 50% Ph. sep. (f/fl) | clear | clear | clear | clear | clear |
| | 2 d | 80% Ph. sep. (f/fl) | clear | 50% Ph. sep. (f/fl) | clear | clear | clear | clear | clear |
| | 3 we | 40% Ph. sep. (f/fl) | clear | 30% Ph. sep. (f/fl) | clear | clear | clear | clear | clear |
| | 4 we | 40% Ph. sep. (f/fl) | clear | 30% Ph. sep. (f/fl) | clear | clear | clear | clear | clear |
| | 4 we + 1 d rt | clear | clear | clear | clear | clear | clear | clear | clear |
| 0° C. | 1 d | clear | clear | clear | clear | clear | clear | clear | clear |
| | 2 d | clear | clear | clear | clear | clear | clear | clear | clear |

TABLE 4-continued

| | | Comp. 1 | Comp. 2 | Comp. 3 | Inv. 1 | Inv. 2 | Inv. 3 | Inv. 4 | Inv. 5 |
|---|---|---|---|---|---|---|---|---|---|
| | 3 we | clear | clear | clear | clear | clear | clear | clear | clear |
| | 4 we | clear | clear | clear | clear | clear | clear | clear | clear |
| | 4 we + 1 d rt | clear | clear | clear | clear | clear | clear | clear | clear |
| Flash point [° C.] | | n.d. | n.d. | >110 | >110 | Boiling at 105° C. | >110 | >110 | >110 |

"XY % Ph. sep. (f/fl)" denotes that the upper phase is present by XY % (i.e. phase separation is visible), wherein the fluid phase is the upper phase and the solid phase is the lower phase; "d" denotes day(s); "we" denotes weeks; "rt" denotes room temperature; the flash point was determined according to CIPAC, MT 12 - Flash Point, Handbook F; www.cipac.org/index.php/f12/364-mt-12-flash-point; and "n.d." denotes not determined.

As can be seen from Table 4, the inventive examples all provide good cold stability for −5° C. and −10° C. In addition, the phase separation occurring at −10° C. is reversed when the sample is allowed to reach room temperature (after one day at room temperature). Without wishing to be bound to any theory, the inventive formulations are considered having an improved biological impact when compared to Comp. 2.

The invention claimed is:

1. A formulation comprising 12.0 to 28.0 wt.-% of L-glufosinate ammonium, 20.0 to 30.0 wt.-% of sodium lauryl ether sulfate, 4.0 to 8.0 wt.-% of 1-methoxy-2-propanol, 7.0 to 11.0 wt.-% of dipropylene glycol, 6.0 to 15.0 wt.-% of an alkyl polysaccharide, and 20.0 to 50.0 wt.-% of water, each based on the total weight of the formulation.

2. The formulation of claim 1, wherein the L-glufosinate ammonium is present in the formulation in an amount of 16.0 to 20.0 wt.-%, based on the total weight of the formulation.

3. The formulation of claim 1, wherein the sodium lauryl ether sulfate is present in the formulation in an amount of 22.0 to 28.0 wt.-%, based on the total weight of the formulation.

4. The formulation of claim 1, wherein the 1-methoxy-2-propanol is present in the formulation in an amount of 5.0 to 6.0 wt.-%, based on the total weight of the formulation.

5. The formulation of claim 1, wherein the dipropylene glycol is present in the formulation in an amount of 7.0 to 9.5 wt.-%, based on the total weight of the formulation.

6. The formulation of claim 1, wherein the alkyl polysaccharide is expressed by the general formula (II)

$$R^2—O—(G)_g—H, \quad \text{(II)}$$

wherein $R^2$ is saturated or unsaturated C4-C24-alkyl, G is a glucose moiety, and g is an average number of 1 to 50.

7. A method for selectively controlling weeds in an area comprising applying an effective amount of the formulation according to claim 1 to the area.

* * * * *